United States Patent
Lambert et al.

(10) Patent No.: US 7,756,740 B2
(45) Date of Patent: Jul. 13, 2010

(54) METHOD FOR CONSTRUCTING AN UPDATEABLE DATABASE OF SUBJECT BEHAVIOR PATTERNS

(75) Inventors: Diane Lambert, Berkeley Heights, NJ (US); Jose' C. Pinheiro, Chatham, NJ (US); Don X Sun, Warren, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1435 days.

(21) Appl. No.: 11/072,372

(22) Filed: Mar. 4, 2005

(65) Prior Publication Data
US 2005/0154633 A1 Jul. 14, 2005

Related U.S. Application Data

(62) Division of application No. 09/572,204, filed on May 17, 2000, now Pat. No. 6,904,409.

(60) Provisional application No. 60/136,746, filed on Jun. 1, 1999.

(51) Int. Cl.
*G06F 17/30* (2006.01)
(52) U.S. Cl. .......................... 705/10; 705/35
(58) Field of Classification Search .................. 705/10, 705/35
See application file for complete search history.

(56) References Cited

U.S. PATENT DOCUMENTS

| | | | | | |
|---|---|---|---|---|---|
| 5,819,226 | A | * | 10/1998 | Gopinathan et al. | 705/44 |
| 6,026,397 | A | * | 2/2000 | Sheppard | 707/5 |
| 6,098,052 | A | * | 8/2000 | Kosiba et al. | 705/40 |
| 6,128,599 | A | * | 10/2000 | Walker et al. | 705/14 |
| 6,278,989 | B1 | * | 8/2001 | Chaudhuri et al. | 707/2 |
| 6,430,539 | B1 | * | 8/2002 | Lazarus et al. | 705/10 |

FOREIGN PATENT DOCUMENTS

GB          2303275  A    *   2/1997

OTHER PUBLICATIONS

Handelsman, Moshe, Ph. D. "Varied Buying Behavior: Measurement Based on Perceptual and Purchase Diary Data." (abstract only) Dissertation from Purdue University, DAI-A 43/06, p. 2076, Dec. 1982.*

* cited by examiner

*Primary Examiner*—Susanna M Diaz
(74) *Attorney, Agent, or Firm*—Martin I Finston

(57) ABSTRACT

Disclosed is a method for maintaining compact descriptions of the behavior of customers in a database of information relating to customer transactions. Of all possible variables that might be used to characterize customer transactions, a limited number are selected on the basis of discriminating power to define customer profiles. Customers are classified according to distinguishing features of their profiles. A new customer can be initially assigned to a particular class based on data characterizing his first few transactions.

3 Claims, 6 Drawing Sheets

METHOD FOR CONSTRUCTING AN UPDATEABLE DATABASE OF SUBJECT BEHAVIOR PATTERNS

CROSS-REFERENCE TO RELATED APPLICATION

This is a divisional of application Ser. No. 09/572,204 filed on May 17, 2000 now U.S. Pat. No. 6,904,409.

This application claims priority of Provisional Application Ser. No. 60/136,746 which was filed Jun. 1, 1999.

BACKGROUND OF THE INVENTION

1. Field of the Invention

The invention relates to methods for storing and updating descriptions of customer behavior in databases of information relating to customer transactions.

2. Art Background

A company that conducts many business transactions with individual customers will often find it advantageous to maintain customer profiles that describe the current transactional behavior of some or all individual customers. Such profiles are advantageously updated each time a customer conducts a transaction.

By way of example, a telephone service provider might profile its customers on the basis of variables such as day-of-week, time-of-day and duration of calls, call origin and destination, and the like. A customer profile is useful, e.g., for fraud detection. That is, if a call made by a purported customer diverges markedly from that customer's profile, it is reasonable to suspect that the caller is fraudulently impersonating the purported customer.

Of course, such profiles are useful in regard not only to customers in the strict sense of the term, but more generally, they are useful in regard to parties to transactions of any kind that has distinguishing features that can be used to discriminate among individual parties. We will continue to apply, herein, the term customer to any such party, but it should be borne in mind that the term is meant in the broad, and not in the restrictive, sense.

Several challenges confront the practitioner who wishes to compile a database of customer profiles. One challenge is to select an appropriate amount of information for storage. Enough information should be stored to provide a useful characterization of the profiled customers. On the other hand, the total amount of stored information should not overwhelm the storage and processing capacities of the database system. Advantageously, the amount of data allocated for each customer, i.e., the profile length, is fixed, because computers can generally process fixed-length profiles faster and more efficiently than they can process variable-length profiles. A limitation to fixed-length profiles, however, makes it even more difficult to select an appropriate amount of information for storage.

A typical profile is a collection of histograms, also referred to herein as "profile components," in each of which a relative frequency of transactions is plotted for each of a plurality of intervals, or bins, along an axis. Measured along the axis is a variable such as time or cost. A time axis might represent, e.g., time of occurrence of a telephone call, call duration, or interval between calls. The variable measured along the axis may be continuous, such as time, or it may be discrete, such as geographical zone (which takes on discrete values such as international and domestic).

A further challenge confronting the practitioner is to choose the appropriate level of resolution along the measurement axis; that is, the appropriate widths of the bins. In general, this is a problem whenever the variable has continuous values or values that fall on many levels. Such variables include the time-based measurements listed above. In regard, for example, to relative frequencies of call occurrence, a pair of gross counts of weekday calls and weekend calls, respectively, might have a relatively large amount of power for discriminating between customers. If that were so, there would be relatively little need to count calls on a daily, much less an hourly, basis. In such a case, choosing coarse rather than fine temporal resolution would be advantageous because such a choice would leave storage space available for a further variable having potentially high discriminating power.

SUMMARY OF THE INVENTION

We have developed a new solution to the problem of customer profiling. Our customer profiles include histograms of a limited number of profile variables which are typically predetermined. For example, one profile variable might be time-of-day, and a corresponding histogram would represent a relative frequency of the number of calls in each of a plurality of bins, each bin representing a range of times on a 24-hour clock. However, we have found that histograms of the profile variables generally have more discriminating power when they are conditioned on other, subsidiary variables which we denominate stratification variables. For example, we might maintain separate time-of-day histograms for domestic calls and for international calls, respectively. In fact, we found that in many cases it will be advantageous to impose multiple conditions so that, for example, separate time-of-day histograms will be maintained for domestic-weekend, domestic-weekday, international-weekend, and international-weekday calls.

Accordingly, our invention in one aspect involves a method for updating a customer profile in which a new transaction is classified in terms of one or more profile variables. For each of one or more profile variables, data relating to the new transaction are used to update at least one histogram that is conditioned on at least one further, stratification variable. In certain embodiments of the invention, the stratification variables are selected to provide at least some discriminating power when applied to most customers, and moreover to provide relatively high discriminating power when applied to at least some customers. It should be noted that whereas at least one profile variable will be stratified, there may also be one or more profile variables that are not conditioned on any stratification variable.

The discriminating power of customer profiles can often be improved by optimizing the bins over which the histograms of profile variables are defined. For example, it might be advantageous in some cases to compile a time-of-day histogram that uses hourly data, but contains bins that span variable numbers of hours. The start time and end time of each bin are adjusted to optimize some figure of merit for the histogram when the histogram is based on a body of training data drawn from representative transactions, here referred to as priming data. The start time and end time are an example of bin cutpoints.

We have found a mathematical procedure for setting the bin cutpoints that is especially advantageous for discriminating customers belonging to a particular target group. Accordingly, the invention in one aspect involves a method for updating a customer histogram in which a new transaction is assigned to a bin whose cutpoints are established by such a mathematical procedure. More specifically, our mathematical procedure seeks to maximize an average weighted Kullback-Liebler distance between the histograms of a general population of customers and the histograms of a target population of customers.

It is often desirable to assign an initial profile to a new customer before the customer has made more than a few transactions. The initial profile is later updated using data from the customer's actual subsequent transactions. We have found a procedure for assigning an initial profile to a new customer. According to our new procedure, information taken from the new customer's first few transactions is used to index the histograms of the new customer. The same indexing procedure is used to characterize the histograms of established customers. A set of representative profiles are compiled using data relating to established customers. Based on similarity of indices, a representative profile is assigned as the initial profile of the new customer. In one aspect, the invention involves such a method for assigning an initial profile to a new customer.

BRIEF DESCRIPTION OF THE DRAWING

FIG. 4 is an expansion of block 20 of FIG. 1.

DETAILED DESCRIPTION

Figure 1:
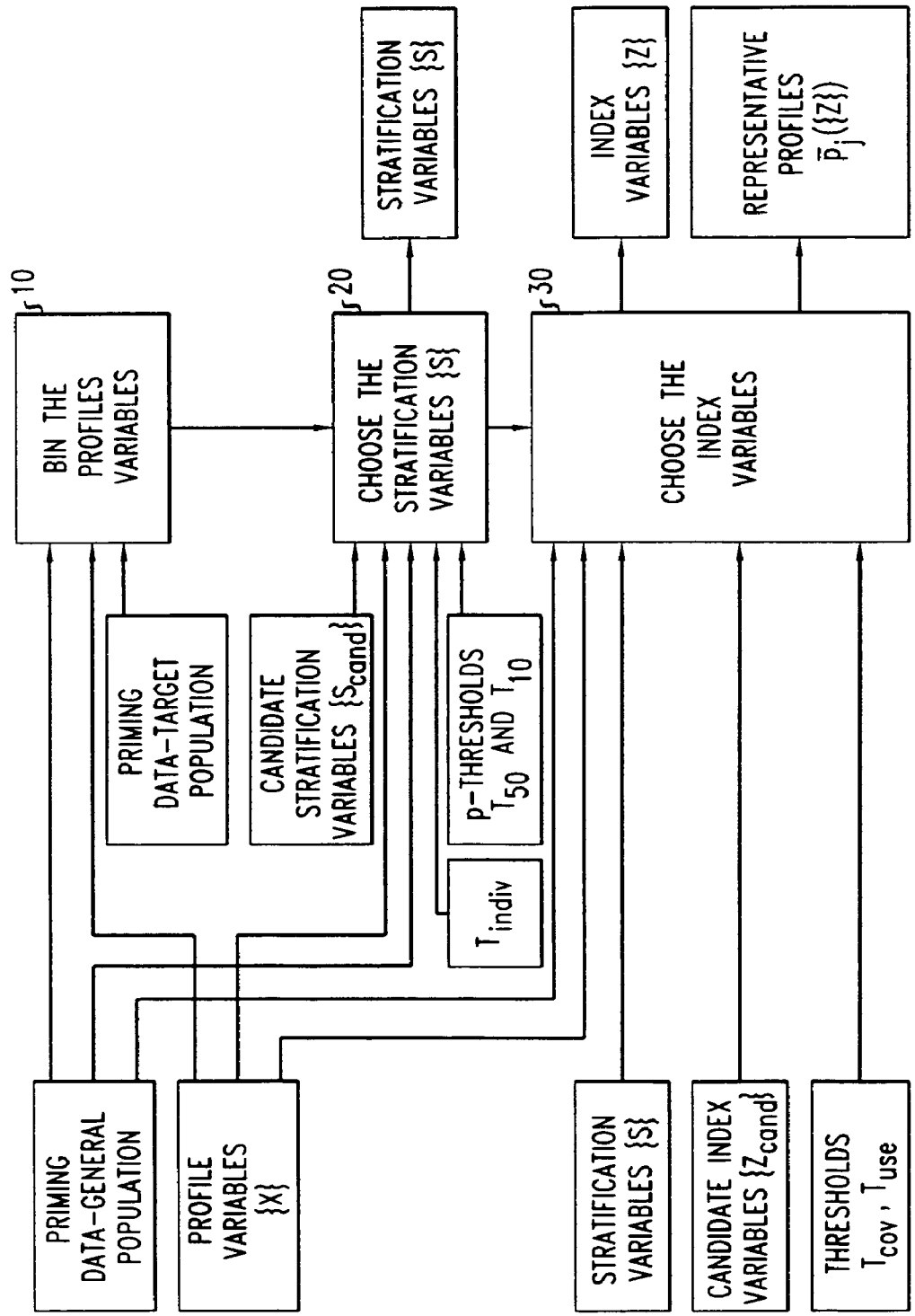
FIG. 1 is a broadly conceptual block diagram illustrating the construction of a data base according to the invention in one embodiment.

FIG. 1 illustrates three stages in the construction of a database according to the invention in an exemplary embodiment. At block 10, optimal cutpoints are established for the histograms of the profile variables. As indicated in the figure, this stage is informed by a set of priming data, i.e., the records of all transactions for a large set of customers during a given period of time. Each record contains values for a set of variables that characterize the transaction. For example, records of wireless calls will typically include values of the date and time of the start of the call, values of flags indicating whether the call was incoming or outgoing and whether it was local or roaming, the value of the call duration, and values for the calling and called numbers.

The variables that characterize the transaction may themselves include profile variables. Other profile variables may be derived from the directly measured variables that characterize the transaction. In FIG. 1, it is assumed that the identities of the profile variables are determined in advance and are provided to block 10. In the symbology to be used below, X refers to the identity of a profile variable, e.g., X=day of week. The symbol x refers to a particular value of the profile variable, e.g., x=Tuesday, or x=Monday through Thursday. Typically, x will identify a particular bin of a histogram for X.

Generally, the number of bins for the histogram of each profile variable will be provided to block 10. Thus, for example, block 10 may be instructed that for the profile variable X=day of week, there shall be three bins. The operation to be performed within block 10 might then determine, e.g., that the three bins shall be Saturday+Sunday, Monday through Thursday, and Friday, respectively. In the exemplary embodiment of the invention, the same number of bins is used for each customer.

As shown in the figure, block 10 is informed by a body of priming data representing a general population of customers, typically a representative group of established customers having transaction histories. As also shown in the figure, block 10 is optionally informed by a further body of priming data representing a specific target population of customers. By way of example, the target population may be a population of fraudulent customers such as telephone callers known to have misused a third party's account.

It should be noted that for some target groups, such as fraudulent callers, it may be difficult to ascertain which of a customer's records are relevant to the target behavior. In that case, not only is the target group itself small, but the number of records for each customer in the target group may also be small.

In the stage represented by block 20 of FIG. 1, a set of stratification variables is selected from a longer list of candidate stratification variables. (It should be noted, however, that there may be some profile variables that are not stratified.) As noted above, a profile variable such as time-of-day might by itself only weakly discriminate between customers, but different groups of customers might have distinctly different time-of-day histograms when those histograms are limited to domestic only calls or to international only calls. In such a case, the binary-valued variable geographical zone is effective as a stratification variable for the profile variable time-of-day, and the two corresponding strata (for the time-of-day profile variable) are domestic and international. In the symbology to be used below, S refers to the identity of a stratification variable, e.g., S=time-of-day. The symbol s refers to a particular value of the stratification variable, i.e., to a particular stratum. In the above example, s takes on one of two possible values for the geographical zone variable; i.e., one of the values domestic and international.

In the operation contained within block 20, stratification variables are selected from the candidate list on the basis of discriminating power. In the exemplary embodiment, discriminating power is measured against three thresholds, denominated in the figure as $T_{indiv}$, $T_{50}$, and $T_{10}$, respectively. The threshold $T_{indiv}$ is used to select stratification variables that have discriminating power when applied to the profile variables of individual customers. A stratification variable has discriminating power in this regard if conditioning the profile variable on the respective strata results in respective conditional histograms that differ distinctly from each other. The threshold $T_{50}$ is used to select stratification variables that have at least some discriminating power for, e.g., at least 50% of the customers in the priming set. Thus, some subset of the candidate stratification variables will typically survive the $T_{50}$ threshold test. The threshold $T_{10}$ is used, for example, to further limit the surviving variables to those that have still greater discriminating power for, e.g., at least 10% of the customers in the priming set. Of course the cutoffs are described as lying at 50% and 10% of the population for illustrative purposes only; $T_{50}$ and $T_{10}$ can in fact be applied with reference to any desired major and minor fractions of the population.

As noted above, combinations of individual stratification variables will often have more discriminating power than individual stratification variables. Accordingly, one result of block 20 is a vector S of stratification variables for each profile variable X that is stratified. Each vector S consists of one or more individual stratification variables S. Different stratification variables may be used for each profile variable. However, once a stratification, i.e., a pair (X, S), has been determined, it is applied to every customer.

To each vector S there corresponds a set of vector strata s. Each vector stratum s contains a value for each of the stratification variables that make up vector S. For example, (X, S) might be [time-of-day, (geographic zone, weekday/weekend)]. In that case, the possible values for s would be (domestic, weekday), (domestic, weekend), (international, weekday), and (international, weekend). Each of these possible values represents a distinct vector stratum for the profile variable time-of-day.

In the stage represented by block 30 of FIG. 1, a set of index variables Z is selected from a longer list of candidate index variables. As noted above, the purpose of the index variables is to derive an index vector z from a new customer's first few transactions, and on the basis of z, to retrieve a stored representative profile component to be included in the new customer's initial profile. In this context, a profile of a customer is a record derived from that customer's historical transactions, comprising a histogram for each vector stratum (X, s).

One simple example of an index variable is based on a new customer's first two calls. If both calls were made at night, z=1. If one was made at night and the other during the day, z=2. If both were made during the day, z=3. Generally, a set of selected index variables Z will be combined to form a vector index variable Z having possible vector values z, as for the strata discussed above.

The operations contained within block 30 result in the selection of a vector Z of index variables having relatively high predictive power among priming records occupying a given vector stratum. A pair of thresholds $T_{cov}$ and $T_{use}$, discussed in detail below, are used in this selection process. As a result of the selection process, a vector Z is selected for each vector stratum (X, s). An illustrative example of Z, based on a customer's first two telephone calls, is (geographical zone, direction). Illustratively, the possible levels z of Z are: (0, 0), (0, 1), (0, 2), (1, 0), (1, 1), (1, 2), (2, 0), (2, 1), and (2, 2), wherein the first component refers to the number of calls (among the customer's first two calls) that are domestic rather than international, and the second component refers to the number of calls that are ingoing rather than outgoing.

Roughly speaking, the following operation takes place within block 30: For each possible value of the vector z, a histogram of X is obtained over those members of the priming population that both: (i) belong to vector stratum s and (ii) have a Z-value of z.

That is, for each (X, s) and each corresponding z, an X-histogram is obtained that is jointly conditioned on s and z. That jointly conditional histogram becomes part of the representative profile for a new customer whose first few transactions are described by the index vector z. A complete representative profile would contain a respective such conditional histogram for each of the vector strata (X, s).

The operations within each of blocks 10-30 will be described, in turn, in further detail below.

Binning of Profile Variables.

Figure 2:
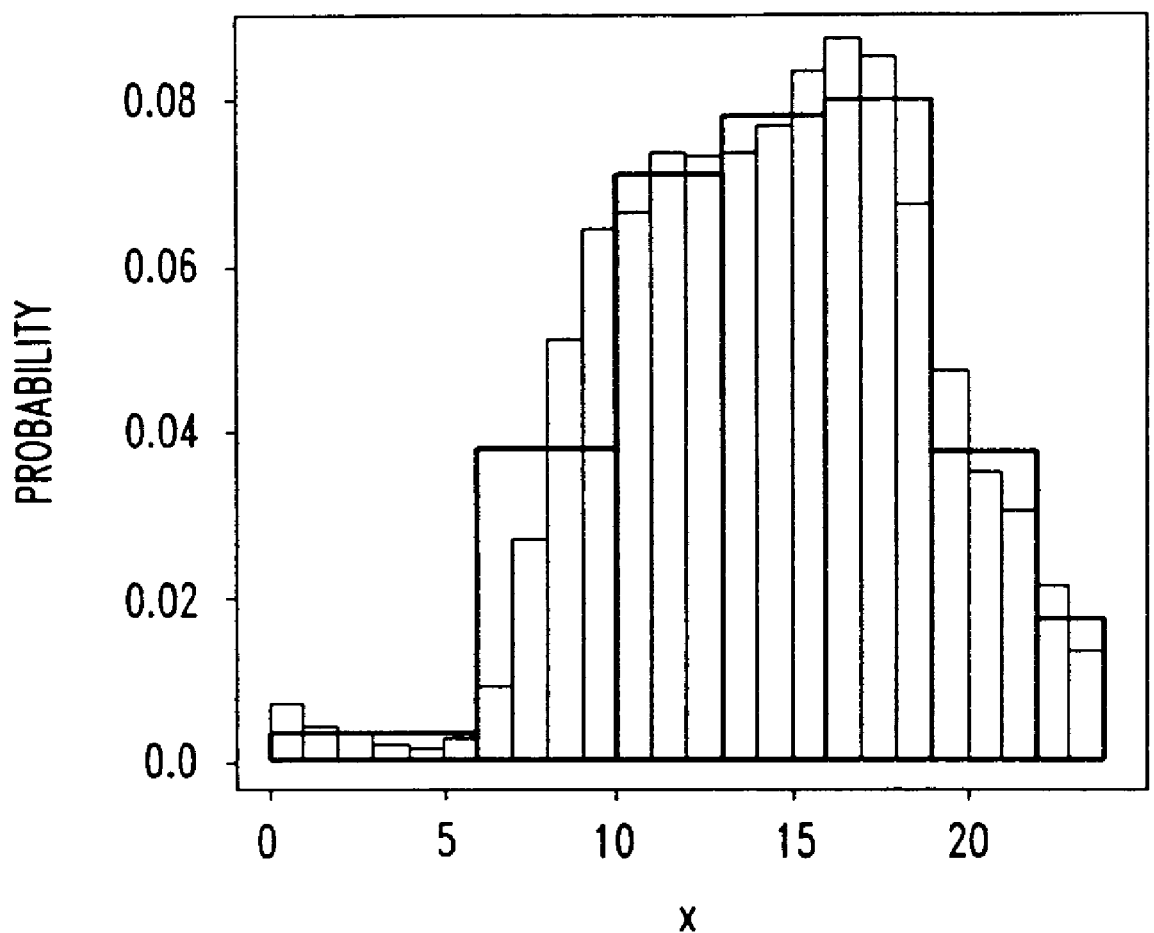
FIG. 2 is an illustrative example comparing a histogram having equal-width bins to a histogram of the same variable having variable-width bins.

As noted above, it will often be advantageous to vary the cutpoints that define the boundaries of each bin in such a way that the discriminating power of the resulting histogram is optimized. By way of illustration, FIG. 2 shows the distribution of a variable X over 24 equally wide bins, and over seven bins having variable width. In that illustrative case, the raw data about variable X are provided in 24 bins, but only seven bins are allocated for the histogram.

Given a profile variable X with K bins allocated for profiling, but with raw data provided in more than K bins, the problem to be solved in block 10 of FIG. 1 is to define the cutpoints of the K bins. If X has discrete values, this task involves grouping values of X into K bins. If X is continuously valued, then it is natural to think of the bins as intervals with cutpoints $d_0 < d_1 < \ldots < d_K$, where $d_0$ is the smallest value of X that can be observed (typically 0 for non-negative continuous variables) and $d_K$ is the largest possible value (possibly infinite). Here the task is to choose $d_1, \ldots d_{K-1}$.

Because the total area beneath the histogram must be unity, any particular choice of bins must satisfy, for each customer i, the requirement that $$\sum_{k=1}^{K} p_{i,k} = 1,$$

where $p_{i,k}$ represents the fraction of transactions of customer i with values of X that fall in bin k.

Those skilled in the art will recognize that given the number N of customers in the priming data, and letting the index i range over all customers in the priming set, the quantity IE, defined by the formula $$IE = \frac{1}{N} \sum_{i=1}^{N} \left( -\sum_{k=1}^{K} p_{i,k} \log p_{i,k} \right),$$

is the well-known average information entropy of the binned data. We have found that if customer profiles are to be used mainly to summarize customer behavior, then the K bins for X are advantageously chosen to maximize the figure of merit IE.

However, if profiling is intended to identify customers that belong to a particular target group, the cutpoints should be set in such a way that, on average, the binned profile variable for a "typical" customer is as far as possible from the average binned profile variable for the target group, given the specified number of bins. Although the variables Pi k define a distribution for each individual customer in the general population, it may not be feasible to similarly define a distribution for each individual customer in the target population. The reason for this is that there may be relatively few target transactions in the priming data. Therefore, it will generally be advantageous to express a figure of merit for targeted profiling in terms of a histogram that expresses the fraction $q_k$ of all transactions for the targeted customers that falls in each bin k. Thus, only one target distribution needs to be computed, and not a separate distribution for each customer in the target group.

We have found a new figure of merit for the binning of profile variables when the profiling is meant to identify members of a target group. Analogously to the optimization procedure described above for binning in the non-targeted context, the cutpoints are now chosen in a manner that maximizes our new figure of merit. The new figure of merit KL depends, in part, upon the quantity log $$\log \frac{q_k}{p_{i,k}},$$

which is referred to as the log-likelihood ratio. Large positive values of this quantity indicate that incidences of the profile variable falling in bin k are likelier under the target profile than under the profile of customer i, whereas large negative values indicate the reverse.

The figure of merit KL is defined by the formula $$KL = \frac{1}{N} \sum_{i=1}^{N} \left( w \sum_{k=1}^{K} p_{i,k} \log \frac{p_{i,k}}{q_k} + (1-w) \sum_{k=1}^{K} q_k \log \frac{q_k}{p_{i,k}} \right).$$

The cutpoints $d_1, \ldots, d_{K-1}$ are chosen so as to maximize KL. In the above formula, w is a parameter continuously adjustable from 0 to 1. When w=0, KL measures the ability to identify members of the target group. When w=1, KL measures the ability to avoid misclassifying a customer who does not belong to the target group. Intermediate values of w balance these two objectives.

Those skilled in the art will recognize that KL, as defined above, is an averaged, weighted, and symmetrized Kullback-Liebler distance from the binned distribution of customer i to the binned target distribution, wherein the average is taken over all customers i.

The cutpoints $d_1, \ldots, d_{K-1}$ that maximize KL are found by exhaustive search when feasible; i.e., when the original variable X has only several possible values. If exhaustive search is not feasible, then we limit the amount of searching by specifying minimum widths for the K final bins. For example, let X represent call duration, which is measured to the nearest second. Then to limit the amount of searching required it would be advantageous, e.g., to force all bins to be at least two minutes long and to search for endpoints at time values equal to whole numbers of minutes rather than seconds.

Stratification of a Profile Variable.

For each profile variable, there is a list of candidate stratification variables. Different profile variables may have different stratification variables. The goal of block 20 of FIG. 1 is to create strata for each profile variable so that transactions that fall in the same stratum are similar on that profile variable, whereas transactions that fall in different strata are dissimilar.

Figure 3:
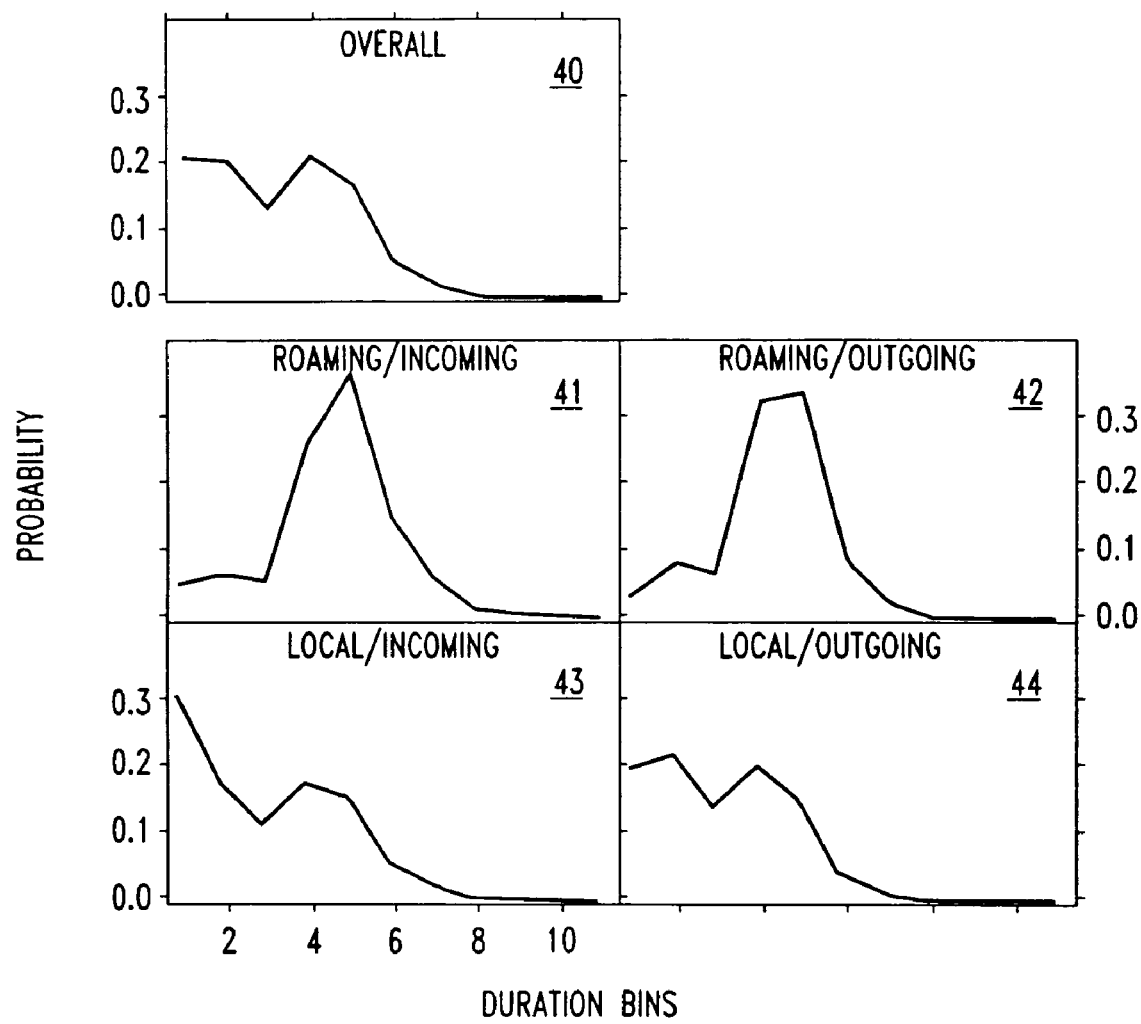
FIG. 3 is a set of histograms illustrating the effect of stratification on the relative frequency distribution of a profile variable.

By way of illustration, panel 40 of FIG. 3 shows an unstratified relative frequency distribution of duration for all calls for one customer of wireless telephone service. Panels 41-44 of the same figure show the relative frequency distributions of duration for the same customer, stratified into the groups defined by the four possible combinations of "service provider", which has levels local and roaming, and "direction," which has levels incoming and outgoing. For this customer, stratifying call durations by provider and direction would be useful. If the relative frequency distributions in the four strata had been similar, then stratifying duration would waste space because the same information would be stored four times. It is advantageous to choose stratification variables that are important for a majority of customers, because in any event the same stratification variables will be used for all customers.

Figure 4:
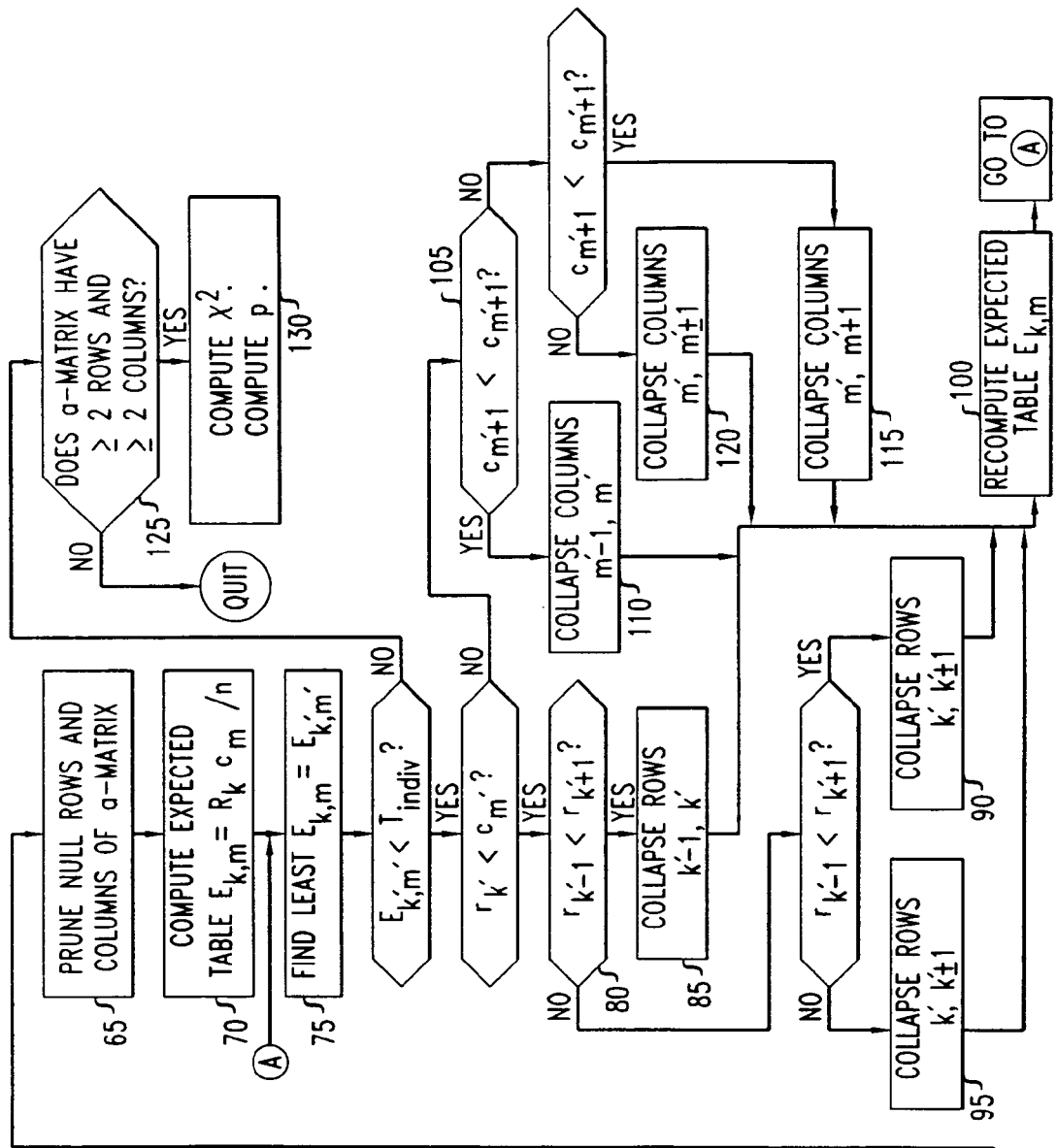
FIG. 4 is a flowchart of a procedure for selecting stratification variables according to the invention in one embodiment.

FIG. 4 is a flowchart of some of the operations to be performed within block 20 of FIG. 1. These operations result in the computation of a figure of merit p for a candidate stratification variable S and a particular customer i. The operations of FIG. 4 are repeated for each customer i. Initially, the operations of FIG. 4 are also repeated for each individual stratification variable S. However, as will be explained below, subsequent computations of p will be performed for stratification vectors S.

As indicated in block 50 of FIG. 4, a particular customer i, profile variable X, and stratification variable S are identified. Variable X has K distinct levels (i.e., "bins") numbered $1, \ldots, K$, and variable S has M distinct levels (i.e., "strata") numbered $1, \ldots, M$. As indicated at block 55, a matrix $\underline{\underline{a}}$ is constructed from the priming data. The matrix $\underline{\underline{a}}$ has M columns, each corresponding to a respective level of stratification variable S. Each column of $\underline{\underline{a}}$ is a histogram of X, conditioned on the corresponding stratum. Thus, the number of rows of $\underline{\underline{a}}$ is equal to the number K of bins of variable X. The element $a_{k,m}$ of matrix $\underline{\underline{a}}$ is the number of transactions for which X falls in its k'th bin and S falls in its m'th level.

Then, as shown at block 60, each column m is advantageously extended to include a column sum $$c_m = \sum_{k=1}^{K} a_{k,m},$$

each row k is advantageously extended to include a row sum $$r_k = \sum_{m=1}^{M} a_{k,m},$$

and a (K+1, M+1) element n is advantageously added to represent the total number of transactions in the priming data for customer i; that is, $$n = \sum_{k=1}^{K} r_k = \sum_{m=1}^{M} c_m.$$

The matrix $\underline{\underline{a}}$, with its column and row extensions, is herein denominated the frequency table for customer i. The frequency table has the following form:

$$\begin{bmatrix} a_{1,1} & a_{1,2} & \ldots & a_{1,M} & r_1 \\ a_{2,1} & a_{2,2} & \ldots & a_{2,M} & r_2 \\ \vdots & & & & \vdots \\ a_{K,1} & A_{k,2} & \ldots & a_{K,M} & r_K \\ c_1 & c_2 & \ldots & c_M & n \end{bmatrix}.$$

A standard $\chi^2$ (chi-squared) test statistic can be computed for the frequency table for customer i to test whether the stratification variable S has discriminating power when applied to profile variable X for customer i. The chi-squared test is useful, provided the expected counts are not too small. A typical minimum count is five. However, less conservative thresholds may also be advantageously imposed. Accordingly, we define a variable threshold $T_{indiv}$. Blocks 65-110 of FIG. 4 describe a procedure for combining entries of the frequency table so that if possible, initially small expected counts will be brought up to or above the threshold.

First, as indicated at block 65, any row whose row sum $r_k$ is zero and any column whose column sum $c_m$ is zero is removed. Then, as indicated at block 70, an expected table is constructed. The expected table has K rows and M columns. The (k, m) entry $E_{k,m}$ of the table is $$\frac{r_k c_m}{n},$$

i.e., the product of the k'th row sum and the m'th column sum, normalized to the total transaction count n. Then, as indicated at block 75, the least expected table entry $E_{k',m'}$ is identified.

If $E_{k',m'}$ is at least $T_{indiv}$, processing continues at block 125, to be described below. If $E_{k',m'}$ is less than $T_{indiv}$ and the corresponding row count is less than the corresponding column count, i.e., if $r_{k'} < c_{m'}$, then column processing takes place as shown at block 105 and the blocks that follow thereafter. However, if $E_{k',m'}$ is less than $T_{indiv}$ and the corresponding row count is at least the corresponding column count, then row processing takes place as shown at blocks 80-95

At block 80, the row counts of the rows just preceding and just following row k' are compared. If $r_{k'-1}$ is less than $r_{k'+1}$, row k' is collapsed with row k'−1 of matrix $\underline{a}$, as shown at block 85. By "collapsed" is meant that the two rows are deleted and a single row equal to their sum is substituted in their place. If $r_{k'-1}$ is greater than $r_{k'+1}$, row k' is collapsed with row k'+1 of matrix $\underline{a}$, as shown at block 90. If $r_{k'-1}$ is equal to $r_{k'+1}$, row k' is collapsed with either row k'−1 or row k'+1 of matrix $\underline{a}$, as shown at block 95. After the row processing of blocks 80-95, the expected table is recomputed from the revised matrix $\underline{a}$, as indicated at block 100.

As noted above, column processing, beginning at block 105, takes place if the least entry $E_{k',m'}$ of the expected table is less than $T_{indiv}$ and the corresponding row count is less than the corresponding column count. At block 105, the column counts of the columns just preceding and just following column m' are compared. If $c_{m'-1}$ is less than $c_{m'+1}$, column m' is collapsed with column m'−1 of matrix $\underline{a}$, as shown at block 110. If $c_{m'-1}$ is greater than $c_{m'+1}$, column m' is collapsed with column m'+1 of matrix $\underline{a}$, as shown at block 115. If $c_{m'-1}$ is equal to $c_{m'+1}$, column m' is collapsed with either column m'−1 or column m'+1 of matrix $\underline{a}$, as shown at block 120. After the column processing of blocks 105-120, the expected table is recomputed from the revised matrix $\underline{a}$, as indicated at block 100.

After the expected table is recomputed at block 100, the procedure of FIG. 4 returns to block 75, where the least entry is identified for the recomputed expected table. After some number of iterations of blocks 75-120, the least entry of the expected table will equal or exceed the threshold $T_{indiv}$. When that threshold condition is satisfied, the count in every cell of the expected table will be at least $T_{indiv}$. When that is true, the procedure continues at block 125. Block 125 is a test to determine whether the final, collapsed version of the expected table has more than one row and more than one column. If the table has only one row or only one column, it is discarded and the procedure terminates for the current customer and stratum. In that case, no $\chi^2$ test statistic is calculated for the current customer and stratum.

However, if the number K' of rows in the table and the number M' of columns in the table are both at least two, the procedure continues at block 130, where the test statistic $\chi^2$ is computed according to the following formula:

$$\chi^2 = \sum_{k=1}^{K'} \sum_{m=1}^{M'} \frac{\left(\frac{r_k \times c_m}{n} - a_{k,m}\right)^2}{\left(\frac{r_k \times c_m}{n}\right)}.$$

We have defined a figure of merit p for stratification variable S as applied to customer i. The figure of merit p is the probability that a chi-squared random variable with (K'−1)×(M'−1) degrees of freedom exceeds the computed value of the test statistic $\chi^2$. As indicated at block 130, p is computed from standard formulas and from the computed value of $\chi^2$.

According to well-known statistical principles, the smaller the p-value, the stronger the evidence that stratification variable S has discriminating power when applied to the profile of X for customer i. However, any candidate stratification variable that is accepted will be applied to all customers, and not only to those for which it has a high p-value. Therefore, it is advantageous to accept only those candidate stratification variables that have discriminating power when applied to a majority of the customers in the priming set.

We have found it especially advantageous to apply two conditions for the acceptance of a candidate stratification variable S: (i) S must have some evidence of discriminating power when applied to a majority of the customers, and (ii) S must have strong evidence of discriminating power for at least some customers. This is advantageous because if S stratifies the profile variable X for any customer, it will stratify it for all customers.

Figure 5:
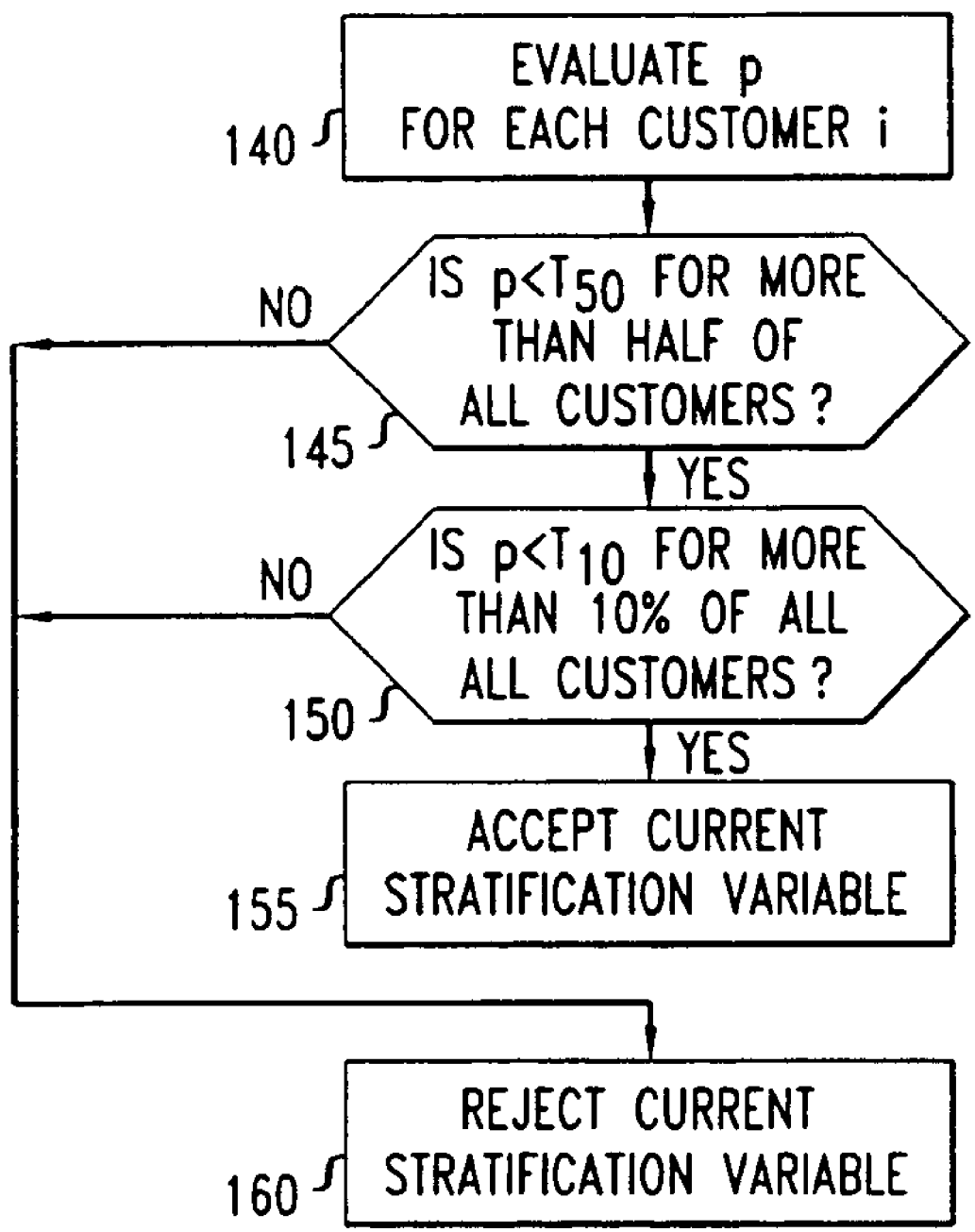
FIG. 5 is a block diagram of an exemplary procedure for applying an acceptance criterion to stratification variables that requires, for each such variable to be accepted, that it have some evidence of discriminating power when applied to a majority of the customers, and strong evidence of discriminating power for at least some customers.

An exemplary application of such a pair of conditions is illustrated in FIG. 5. At block 140, p is evaluated for each customer i using the procedure of FIG. 4 and a given stratification variable S. At block 145, a determination is made whether p is less than an upper threshold $T_{50}$ for more than 50% of the customers in the priming set. A typical value of $T_{50}$ is 0.05. If 50% or fewer customers have sub-threshold p-values, the current stratification variable S is rejected, as indicated at block 160. At block 150, a similar determination is made whether p is less than a lower threshold $T_{10}$ for more than 10% of the customers in the priming set. A typical value of $T_{10}$ is 0.01. If 10% or fewer customers have sub-threshold p-values, the current stratification variable S is rejected, as indicated at block 160. If the threshold tests of blocks 145 and 150 are both satisfied, the current stratification variable S is accepted. If no stratification variable is found that satisfies the threshold tests, the corresponding profile variable X is not stratified.

As noted above, the 50% and 10% population levels described here for application of the threshold tests are purely illustrative and can be changed to suit specific applications. Similarly, the thresholds on p of 0.05 and 0.01 are purely illustrative and can also be changed to suit specific applications.

If two or more individual stratification variables S are found acceptable according to the procedure of FIG. 5, a vector stratification variable S is then selected. An exemplary procedure for selecting a vector stratification variable begins by selecting one variable from an acceptable set defined as those candidate stratification variables deemed acceptable according to the procedure of FIG. 5. The selected variable is that member of the acceptable set having the "best" distribution of p-values, e.g. the largest fraction of customers for whom p is less than $T_{10}$. All non-selected variables return to the pool of candidate variables. A set of two-component vector stratification variables is then constructed by pairing the selected variable with each candidate variable in the pool.

These two-tuples $(S_1, S_2)$ become the new candidate stratification variables for X. The procedures of FIGS. 2 and 3 are applied to the new candidate stratification variables, which are now vector variables. The vector stratification variable having the best distribution of p is then selected as the foundation for a new set of candidate stratification variables. The new variables are constructed by appending each remaining candidate variable in the pool to the selected foundation. This procedure is repeated until vector stratification variables of a desired size are achieved. Although larger sizes are possible, a vector stratification variable typically has no more than three elements $(S_1, S_2, S_3)$. The procedure may be terminated early, and the desired size of the vector variable reduced accordingly, if a distribution of p-values is returned that fails the threshold tests of FIG. 5.

Representative Profiles.

We will now describe an indexing procedure that can be used for assigning an initial profile to a new customer who has made only one or a few transactions. The initial profile is readily updated using the new customer's own transaction data, exemplarily at periodic intervals or when further transactions take place.

Briefly, our approach is to reduce the information in a customer's first transactions to a set of index variables that are used to choose the best representative profile for the customer from a set of reference profiles that describe behavior patterns occurring in the priming set of data. Advantageously, each stratum X,S,s) for each profile variable X is indexed separately, without regard to the indexing for other strata of the same profile variable or the indexing for any strata of other profile variables. For example, a customer profile for wireless calling might include the following three strata for X=duration: (i) duration of roaming incoming calls, (ii) duration of local incoming calls, and (iii) durations of all outgoing calls. Each duration stratum would be indexed separately.

Suppose that profile variable X has K bins. Suppose further that based on the priming data, customer i has a histogram (also referred to here as a "profile component") $p_i = (p_{i,1}, \ldots, p_{i,K})$ for profile variable X conditioned on stratum s of stratification variable S. If Z is a choice of index variables for the stratum X,S,s), then each possible vector value z of Z will correspond to a respective representative profile component $r_z = (r_{z,1}, \ldots, r_{z,K})$. It is an object of our indexing procedure to choose the index variables Z so that the representative profile component $r_z$ that would be applied to customer i will always be as close as possible to the profile component $p_i$ computed from the priming data. As a consequence, application of the indexing procedure to a new customer is likely to assign a representative profile component that is close to the profile component that would have been used if the customer's future transactions had been known.

It should be noted that the candidate index variables need not be a subset of the profile and stratification variables, and they may be binned differently from the profile and stratification variables. For example, day-of-week may have seven values as a profile variable, three binned values of weekday/Saturday/Sunday as a stratification variable, and only the two values weekday/weekend as an index variable. However, it must be possible to assign values to the index variables at the time that the representative profile is to be assigned to the new customer.

Our procedure for choosing index variables is sequential; that is, we construct a vector index variable Z by adding individual candidate index variables Z one at a time until the incremental benefit from adding any of the remaining candidates is insignificant. We will now describe our procedure with reference to FIG. 6.

Initially, a stratum X,S,s) is obtained, having K levels $k = 1, \ldots, K$, as indicated at block 170. Priming data for this stratum are retrieved, as indicated at block 175. A candidate index variable Z, having J levels $j = 1, \ldots, J$ is identified, as indicated at block 180. An initial, or in subsequent iterations a new, level j is selected, as indicated at block 185. The customers i for whom Z has level j will be referred to as the selected customers. The number of such customers will be denoted $N_j$. As indicated at block 190, the priming data are obtained for the selected customers i, $i = 1, \ldots, N_j$.

At block 200, a histogram of stratum X,S,s) is obtained for each of the selected customers. Because of the way these customers are selected, each of these histograms is conditioned on (Z,j). For the i'th such customer, the histogram that is obtained is here denoted $p_{i,j} = (p_{i,j,1}, \ldots, p_{i,j,K})$.

At block 205, the profile components $p_{i,j}$ are averaged over all selected customers i to obtain the j'th average conditional profile component $\bar{p}_j$. That is, $\bar{p}_j = (\bar{p}_{j,1}, \ldots, \bar{p}_{j,K})$ for the selected customers, wherein $$\bar{p}_{j,k} = \frac{1}{N_j} \sum_{i=1}^{N_j} p_{i,j,k}.$$

At block 210, the average unconditional profile component $\bar{p}_0 = (\bar{p}_{0,1}, \ldots, \bar{p}_{0,K})$ is computed for the stratum (Z, S, s) according to $$\bar{p}_{0,k} = \frac{1}{\sum_{j=1}^{J} N_j} \sum_{j=1}^{J} \sum_{i=1}^{N_j} p_{i,j,k}.$$

It should be noted that when further candidate index variables Z after the initial such variable are considered, the procedures of blocks 205 and 210 are modified. As explained below, a candidate index variable is adopted for indexing if it survives the selection procedure of block 290. When the next candidate index variable $Z_n$ is to be considered, it is appended to those of the previously considered variables that have survived block 290, thereby defining a vector index variable Z. The average conditional profile component $\bar{p}_j$ is then conditioned not only on the current (Z,j), but also on selected levels j of preceding candidate index variables. Similarly, the average unconditional profile component $\bar{p}_0$ is replaced by a profile component that is conditioned on selected levels j of the preceding candidate index variables (i.e., those that have survived block 290), but not of the current candidate index variable.

Returning to the description of how the initial candidate index variable is treated, a pair of bin distances $b_{i,j,k}$ and $b_{i,0,k}$ is next computed for each selected customer i, as indicated at block 215. The bin distances are intermediate values for the computation of the effect of level j of the candidate index variable Z, as explained below. The bin distances are defined by:

$$b_{i,j,k} = \begin{cases} |\log(p_{i,j,k}/\overline{p}_{j,k})| & \text{if } p_{i,j,k} > 0 \\ -\log(\overline{p}_{j,k}) & \text{otherwise.} \end{cases}$$

$$b_{i,0,k} = \begin{cases} |\log(p_{i,j,k}/\overline{p}_{0,k})| & \text{if } p_{i,j,k} > 0 \\ -\log(\overline{p}_{0,k}) & \text{otherwise.} \end{cases}$$

At block 220, a variable that we refer to as the effect $D_{i,j}$ of (Z, j) for customer i is computed according to $$D_{i,j} = \sum_{k=1}^{K}(b_{i,0,k} - b_{i,j,k}).$$

Ideally, the conditional profile component $\overline{p}_j$ will be a better match to a selected customer's profile component than will the unconditional profile component $\overline{p}_0$. For each selected customer i, the effect $D_{i,j}$ measures the extent to which this is true. $D_{i,j}$ is positive if $\overline{p}_j$ is closer to the customer's profile component than the average profile component $\overline{p}_0$, which does not depend on Z. The better a match $\overline{p}_j$ is relative to $\overline{p}_0$, the more positive $D_{i,j}$ is.

At block 225, an average effect $\overline{D}_j$ of (Z,j) over all selected customers is obtained according to $$\overline{D}_j = \frac{\sum_{i=1}^{N_j} D_{i,j}}{N_j}.$$

Thus, the average effect is a measure of how effective the current index level (Z,j) is for approximating the customer's profile component, when compared to the average profile component from the general priming population.

As indicated at block 230, the procedure of blocks 185-225 is repeated for each value of j, from j=1 to j=J, thereby to obtain an average effect $\overline{D}_j$ for each index level (Z,j) of the given candidate index variable Z.

As noted, the index level (Z, j) has significant power to explain or predict a given customer's transactional behavior only when $\overline{D}_j>0$. Therefore, when a new customer is ready to be assigned a representative profile, it is useful to determine from, e.g., the new customer's first two transactions a set of levels z for the respective index variables Z that are available, and then to assign to that customer a stored representative profile that has been indexed by those levels z for which $\overline{D}_z>0$. (The subscript z is used herein to indicate a level j of an index variable when used for the purpose of assigning a representative profile to a new customer.) Thus, for each (Z, z) for which $\overline{D}_z$ is positive, the representative profile component assigned to the customer is advantageously conditioned on (Z, z). However, if $\overline{D}_z$ is negative or zero, it is more advantageous to assign a representative profile component that is not conditioned on (Z, z), although of course it may be conditioned on other index variables for which $\overline{D}_z$ is positive.

Returning to FIG. 6, blocks 235-265 describe a threshold procedure for provisionally accepting the candidate index variable Z. As an aide for describing this threshold procedure, we now introduce the concept of covered customers. Given a candidate index variable Z, a customer is covered if he belongs to a level (Z,j) of the candidate index variable for which $\overline{D}_j$ is positive. As indicated at block 235, we compute the fraction of all customers in the complete set of priming data who are covered relative to the given candidate index variable Z. (The covered customers are the customers whose representative profiles would be indexed by Z.) We refer to this fraction as the coverage of Z, and we represent it by the symbol $C_z$.

At block 240, we introduce a further quantity $U_z$, which we refer to as the usefulness of Z. The usefulness of Z is the fraction of the covered population for whom the effect $D_{i,j}$ of (Z,j) is positive. At block 245, we introduce yet a further quantity $R_z$, which we refer to as the support of Z. The support of Z is defined as the product $R_z=U_zC_z$. This expresses the fraction of customers in the complete priming data in regard to whom it is beneficial to use Z to index stratum X,S,s).

At block 250, we introduce a further quantity $V_z$, which we refer to as the average value of Z. The average value of Z is the mean value of $D_{i,j}$ over all of the covered customers.

Whether Z is useful for indexing, i.e., whether it has predictive power, depends on its coverage, usefulness and average value. Ideally, an index variable would have discriminating power when applied to all customers (i.e., it would have complete coverage) and would have a large effect when applied to all customers (i.e., it would have a large average value and complete usefulness). In practice, however, there may be a tradeoff between candidate index variables that apply to a large fraction of customers but have a small effect for each customer and candidate index variables that affect a small fraction of customers but have a larger effect for the customers that are affected.

We manage this compromise as follows: First, we reduce the set of candidate index variables to those with coverage and usefulness above specified thresholds $T_{cov}$ and $T_{use}$, respectively. For example, we may require a minimum coverage of 30% and a minimum usefulness of 50%.

If no candidate index variable exceeds both thresholds, then index selection stops, without adding an index variable. On the other hand, if more than one candidate index variable exceeds both thresholds, the choice of the best candidate index variable needs to be guided by a balancing of the relative importance of support versus that of average value. For example, if $Z_1$ has 80% support with an average value of 0.2 while $X_2$ has 40% support, then how large must the average value for $x_2$ be before it is considered as good as $X_1$?

This tradeoff can be made by defining constants $\alpha_V \geq 1$, $\alpha_R \geq 1$ for which $(\alpha_R R_1, I_1)$ is deemed equivalent to $(R_2, \alpha_V, V_2)$ when $R_1 > R_2$ and $V_1 < V_2$ for candidate index variables $Z_1$, and $Z_2$. For example, suppose $\alpha_V=2, \alpha_R=4$. Then $Z_1$ and $Z_2$ are equivalent if $Z_1$ has twice the coverage of $Z_2$ but $Z_2$ has four times the average improvement of $Z_1$.

Then, the best candidate index variable may be chosen as that Z for which the objective function $$g(R, V) = V \times \exp\left(\frac{\log(a_V)}{\log(a_R)}\log(R)\right)$$

is maximized.

Figure 6:
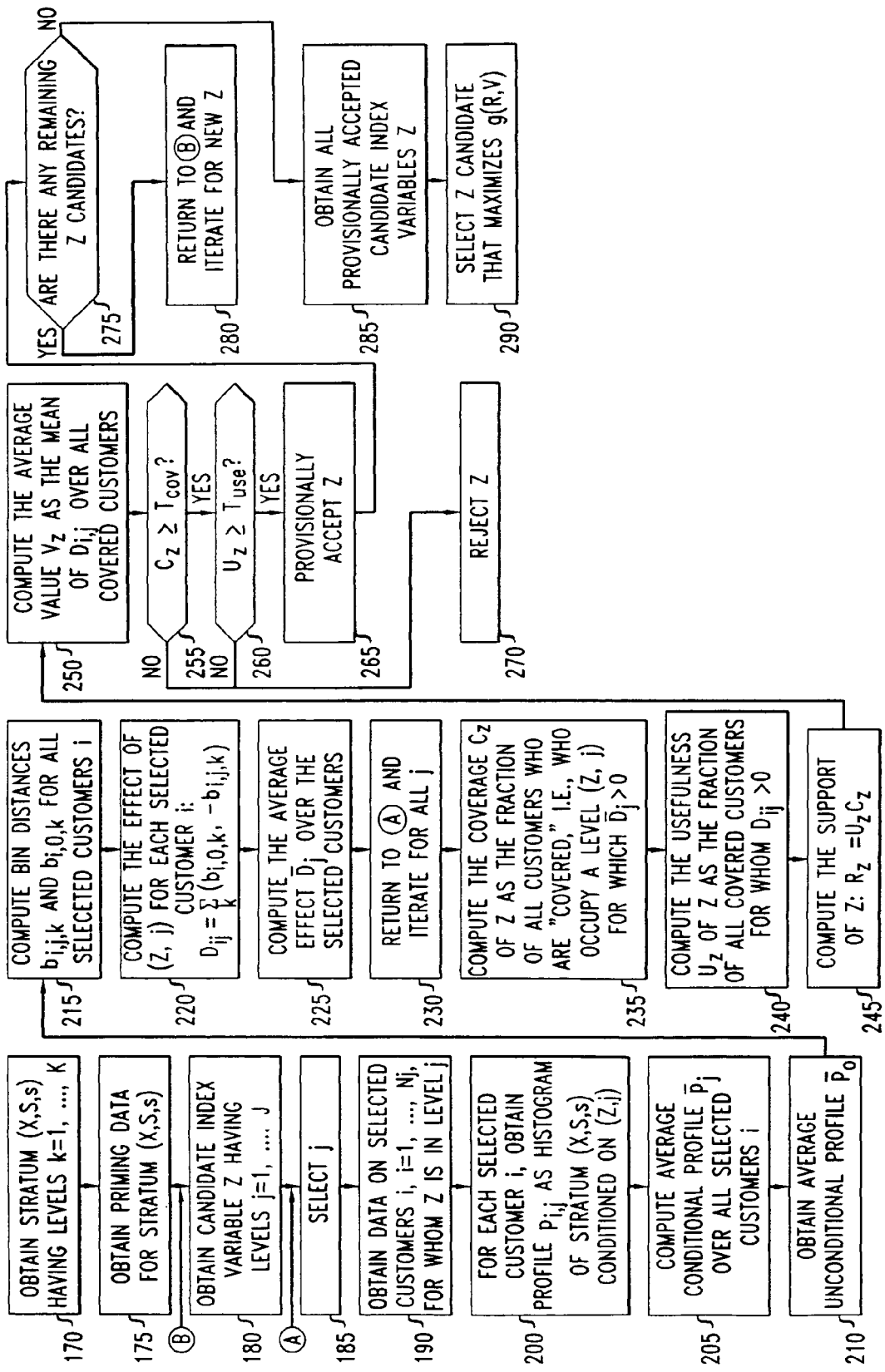
FIG. 6 is a flowchart of a procedure for choosing index variables according to the invention in one embodiment.

The procedure, described above, for selecting those candidate index variables that are most useful, is illustrated by blocks 255-290 of FIG. 6. At block 255, the coverage of Z is compared with the threshold $T_{cov}$. If the coverage is less than the threshold, the current candidate index variable Z is rejected, as indicated at block 270. Otherwise, as indicated at block 260, the usefulness of Z is compared with the threshold $T_{use}$. If the coverage is less than the threshold, Z is rejected. Otherwise, Z is provisionally accepted, as indicated at block 265.

As indicated at blocks 275 and 280, the entire procedure of blocks 180-270 is repeated for each of the candidate index variables, thereby to accumulate, as indicated at block 285, a list of all candidate index variables that are provisionally accepted. Then, as indicated at block 290, the single provisionally accepted index variable that maximizes the objective function g(R,V) is selected for final acceptance.

As noted above, the procedure of blocks 180-290 is iterated for each given stratum X,S,s) to construct a finally accepted vector index variable. The procedure will typically be iterated until a predetermined number of index variables have been finally accepted. However, the procedure may terminate after fewer than the predetermined number of index variables have been found, if, e.g., the threshold tests of blocks 255 and 260 show that further index variables will add insufficient discriminating power.

In each iteration of blocks 180-290 after the first such iteration, all conditional distributions are conditioned not only on the current index level, but also on selected levels of all previous finally accepted index variables. That is, each level j of the current index variable, which is now a vector index variable, represents a selection from all of the possible ways to choose one level from each of the finally accepted index variables, plus one level from the current candidate index variable. However, no conditional distribution is conditioned on any level (Z, j) for which the average effect $\overline{D}_j$ is less than or equal to zero.

Moreover, as noted above, the unconditional profile component $\overline{p}_0$ of block 210 is replaced by a profile component conditioned on selected levels of all previous finally accepted index variables, but not conditioned on the current level (Z, j) of the current candidate index variable. Again, no profile component is conditioned on any level (Z,j) for which the average effect $\overline{D}_1$ is less than or equal to zero.

A final representative profile component is computed and stored for each stratum (X, S, s) and index level (Z, z). In effect, the final representative profile component corresponding to index variables Z for stratum X,S,s) is computed as follows:

1. Find all customers in the priming set who belong to stratum X,S,s) and index level (Z, z), wherein Z represents the vector of all finally accepted index variables, and z represents a vector of respective levels, in which one such level is selected for each component Z of Z. However, omit from the vectorial index level (Z, z) any component (Z, z) for which the average effect $\overline{D}_z$ is less than or equal to zero.

2. Find $p_i=(p_{i,1}, \ldots, p_{i,K})$, the profile component of X for stratum X,S,s), for each customer i identified in Step (1).

3. Set the representative profile component $r_z=(r_{z,1}, \ldots, r_{z,K})$ equal to the average of the profile components found in Step 2. If the number of customers found in Step (1) was $n_z$, then $$r_{z,k} = \frac{1}{n_z}\sum_{i=1}^{n_z} p_{i,k},$$

in which the summation is carried out only over those customers found in Step (1). Significantly, the population over which the summation is carried out is conditioned only by individual index levels z for which the average effect $\overline{D}_z$ is positive.

Extensions of our Method to More General Forms of Distributions of Statistical Variables The preceding discussion has been directed to discrete and categorical profile variables. It should be noted, however, that our method is readily adapted to any continuous distribution that has a finite representation. For example, our method, with appropriate modification is applicable to normal distributions, because normal distributions can be represented by two parameters (typically, the mean and variance).

Our method can also be applied to nonparametric continuous distributions, because these can be represented flexibly by splines (i.e., as linear combinations of basis functions). If the representation takes too much space, then a coarser representation can be found by replacing the chi-squared test for choosing discrete stratification variables with an analysis of variance test. In choosing candidate stratification variables, the average profile component $\overline{p}_j$ for (Z,j) is the average density for the group, which is defined by $$\overline{p}_j(x) = \frac{1}{N}\sum_{i=1}^{N_j} p_{i,j}(x),$$

where $p_{i,j}(x)$ is the density for customer i in stratum (S, s) conditioned on (Z, j). The effect of using index variable Z for customer i is then defined by:

$$D_{i,j} = \int \left(\left|\log\left(\frac{p_{i,j}(x)}{p_j(x)}\right)\right| - \left|\log\left(\frac{p_{i,j}(x)}{p_{0,i}(x)}\right)\right|\right)dx,$$

where $\overline{p}_0$ is the current profile component for customer i without the candidate index variable. The average effect of Z, coverage of Z, and average improvement of Z are then defined exactly as in the discrete case. Thus, the entire procedure for defining, stratifying, and indexing profile components is carried out as for continuous variables with little modification.

It should be noted that the procedures for choosing stratification and index variables do not have to start from the null state of no variables. Instead, some variables can be forced to be included as stratification variables or index variables. For example, if the profile variable is duration, then it may be desirable to also include duration (with a possibly different set of bins or parameters) as an index variable. Additional index variables may then be chosen sequentially.

The procedures described above are readily carried out using a data processing machine such as a general purpose or special purpose digital computer operating under the control of an appropriate hardware, software, or firmware program. The specific process steps described above are purely exemplary, and not intended to limit the scope of the invention. Those skilled in the art will appreciate that numerous alternative sequences of process steps will achieve essentially the same results and thus also fall within the spirit and scope of the present invention.

What is claimed is:

1. A method to be used by or for an entity which transacts with customers to provide the customers with goods or services, and which records attributes of customer transactions, referred to as profile variables, comprising at least one of time or duration of a transaction, nature or amount of the thing contracted for, or other transactional attributes having two or more possible values and lending themselves to treatment as statistical variables, for the purpose of distinguishing customers by their records of transactional behavior, the method comprising:

a) from a new transaction with a customer, obtaining at least one new value of a profile variable and storing said value in a computer-accessible medium;

b) from the new transaction, obtaining a corresponding value of at least one additional variable selected to have some discriminating power for most customers and more discriminating power for at least a specified fraction of the population of customers, the additional variable being referred to as a stratification variable;

c) assigning the obtained value of at least one said stratification variable to one stratum from a plurality of strata, wherein each said stratum corresponds to a distinct value or range of values of the stratification variable;

d) assigning the obtained value of a profile variable to one of a plurality of bins which represent respective ranges of possible values of the profile variable;

e) accessing, using a computer, a storage medium containing one or more histograms for each customer in the customer population, wherein: each histogram represents a relative frequency with which values of a profile variable for a given individual customer fall in each of a plurality of bins, at least some of the histograms are conditioned on one or more stratification variables, the storage medium is structured for histograms to be accessible by reference to customer, profile variable, and stratification variable, and the accessing step comprises specifying the customer who is party to said new transaction, specifying said at least one obtained new value of a specified profile variable, and specifying said at least one obtained value of a corresponding stratification variable; and f) responsive to (d), using the computer to adjust the relative frequencies stored in at least one histogram, wherein said histogram represents a relative frequency of said specified profile variable for said specified customer, conditioned on said specified value of a stratification variable, wherein:

a stratification variable has discriminating power for a given customer if the histogram of at least a given profile variable for the given customer breaks into sufficiently different histograms when it is conditioned on different values of the stratification variable, the difference between the histograms being measured as a value of a statistical function, and the sufficiency of said difference being determined by comparison to a threshold.

2. The method of claim 1, wherein, in (b), the discriminating power is measured, in part, by performing a statistical chi-squared test in which a test statistic $\chi^2$ is derived from histograms conditioned on at least one stratification variable.

3. The method of claim 2, wherein:

the possible values of at least one said stratification variable fall into two or more strata, each stratum corresponding to a distinct value or range of values of the stratification variable; and the test statistic $\chi^2$ is derived from two or more histograms conditioned, respectively, on the stratification variable falling in each of said two or more strata.

* * * * *